United States Patent [19]

Ozawa et al.

[11] 4,075,172
[45] Feb. 21, 1978

[54] NOVEL AROMATIC COPOLYAMIDES PREPARED FROM 3,4' DIPHENYLENE TYPE DIAMINES, AND SHAPED ARTICLES THEREFROM

[75] Inventors: Shuji Ozawa, Hachioji; Yasuo Nakagawa, Hino; Kichiro Matsuda, Hino; Toshio Nishihara, Hino; Hideki Yunoki, Hino, all of Japan

[73] Assignee: Teijin Limited, Osaka, Japan

[21] Appl. No.: 641,898

[22] Filed: Dec. 18, 1975

[30] Foreign Application Priority Data

Dec. 27, 1974 Japan .................................. 49-149027
May 20, 1975 Japan .................................. 50-59200
May 20, 1975 Japan .................................. 50-59201

[51] Int. Cl.$^2$ ...................... C08G 69/32; C08G 69/40; C08G 69/42
[52] U.S. Cl. ............................. 260/47 CZ; 260/30.2; 260/30.6 R; 260/30.8 R; 260/32.4; 260/32.6 N; 260/49; 260/63 R; 260/65; 260/78 R; 264/184
[58] Field of Search ............. 260/47 CZ, 78 R, 63 N, 260/65, 63 R, 49

[56] References Cited

U.S. PATENT DOCUMENTS 3,354,127   11/1967   Hill, Jr. et al. .......................... 260/78
3,631,003   12/1971   Goodman et al. ................... 260/78 R
3,673,162   6/1972    Buckley et al. ...................... 260/78 R Primary Examiner—Lester L. Lee
Attorney, Agent, or Firm—Sherman & Shalloway

[57] ABSTRACT

A novel fiber- or film-forming high-molecular-weight aromatic copolyamide consisting essentially of (1-A) a diamine recurring unit of the formula

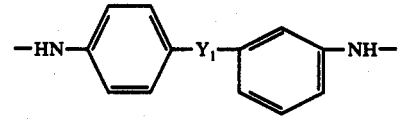

such as 3,4'-diaminodiphenyl ether or 3,4'-diaminodiphenyl sulfone, (1-B) a diamine recurring unit of the formula —HN—Ar$_1$—NH— such as p-phenylene diamine, and (2) a dicarboxylic acid recurring unit of the formula —OC—Ar$_2$—CO— such as terephthaloyl dichloride, wherein Y$_1$, Ar$_1$ and Ar$_2$ are as defined in the specification, the total amount of recurring units (1-A) and (1-B) being substantially equimolar to recurring unit (2), and the proportion of recurring unit (1-A) being 7.5 to 40 mole% of the entire recurring units. The copolyamide is well soluble in solvents to give solutions having good flowability and stability that can afford shaped articles with superior thermal stability, fire retardancy and mechanical properties. A process for preparing the copolymer, and a dope of the copolymer are also provided.

15 Claims, No Drawings

NOVEL AROMATIC COPOLYAMIDES PREPARED FROM 3,4' DIPHENYLENE TYPE DIAMINES, AND SHAPED ARTICLES THEREFROM

This invention relates to novel high-molecular-weight aromatic copolyamides, shaped articles of these copolyamides such as fibers or films, and to processes for producing these copolyamides and shaped articles.

More specifically, this invention relates to wholly aromatic copolyamides containing as a copolymer component a diamine recurring unit (1-A) of the following formula

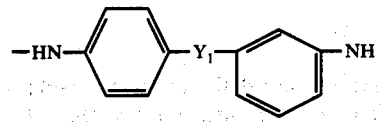
(1-A)

wherein $Y_1$ is at least one group selected from the class consisting of

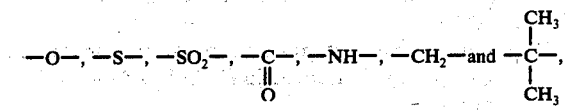

shaped articles made therefrom, and processes for producing these copolyamides and shaped articles.

Aromatic polyamides are known to have a high melting point and a high glass transition point and superior thermal stability and chemical resistance and other chemical and physical properties. Fibers prepared from these aromatic polyamides and having superior thermal stability are useful as heat resistant fibers, and fibers prepared from them and having superior mechanical properties such as a high initial Young's modulus or tensile strength are useful as reinforcing materials for rubbers such as tire cords and composite materials such as plastic reinforcing materials.

It is known in particular that aromatic homo- or copolyamides in which bond chains extend from each of the aromatic rings in a coaxial or parallel direction, such as poly(p-phenylene terephthalamide), afford fibers having a high Young's modulus. However, polyamides having such a high rigidity or symmetry generally have the defect of poor solubility in solvents which makes them difficult to fabricate, while they in fact have superior mechanical characteristics. For example, poly(p-phenylene terephthalamide) is soluble only in a limited number of solvents, for example, strong acids such as conc. sulfuric acid, and solvents consisting of a mixture of hexamethyl phosphoramide and N-methylpyrrolidone or tetramethylurea to which an inorganic salt such as lithium chloride has been added. When these polyamides are shaped on a commercial scale, the use of strong acids involves various problems such as the corrosion of the equipment, danger associated with the handling of the acid and the difficulty of treating waste liquid. In addition, complicated operating conditions are required for dissolving these polymers in solvents, and it is not easy to form solvent solutions of these polymers.

It is known that in order to enhance the solubility of polyamides having high rigidity and symmetry, such as aromatic homo- or copolyamides having bond chains extending from each of the aromatic rings in a coaxial or parallel direction, a meta-phenylene skeleton or a skeleton of the formula

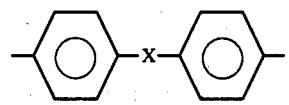

in which X is, for example, —O—, —S—, or $CH_2$- is introduced into the polyamides. The solubility of the copolyamide is improved to some extent by the introduction of the meta-phenylene skeleton. However, fibers prepared from such a copolyamide tend to suffer from a greater reduction in their dynamical characteristics, especially their initial Young's modulus, as the proportion of the meta-phenylene skeleton becomes greater. The introduction of the

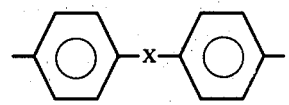

skeleton also leads to some improvement of the solubility of the resulting copolyamide, but fibers prepared from the resulting copolyamide also tend to suffer from a marked reduction in their dynamical characteristics, especially their initial Young's modulus.

Vysokomol. soed. B14 (1972) reports at pages 653 to 657 that poly(3,4'-diphenyloxy terephthalamide) composed of a recurring unit of the formula

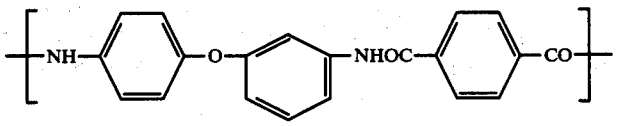

is far more susceptible to heat deterioration than other wholly aromatic polyamides. However, this report fails to give any disclosure about fibers of this polymer.

U.S. Pat. No. 3,801,545 discloses an aromatic copolyamide composed of a recurring unit of the formula

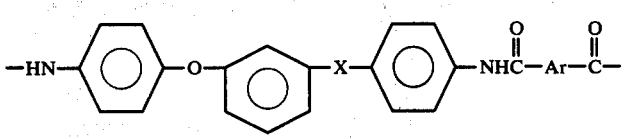

wherein X is

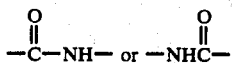

and high modulus filaments prepared from this copolyamide. In order to obtain a polyamide having such a skeleton, a monomer of the formula

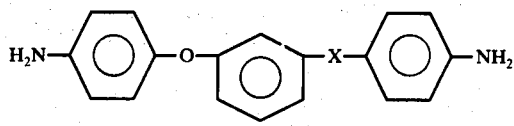

wherein X is

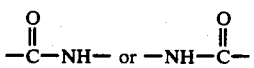

must be used. The production of such a monomer is not economically advantageous because it entails complicated production and purification procedures. In addition, the tensile strength of the filaments disclosed in this United States Patent is 9.2 g/dtex, i.e. about 10 g/denier, at the highest.

Accordingly, it is an object of this invention to provide novel aromatic copolyamides which have so superior solubility as to give polymer solutions having good flowability and stability that can afford shaped articles, such as fibers or films, having superior thermal stability, fire retardancy, and mechanical properties such as Young's modulus or tensile strength; and a process for preparing these copolyamides.

Another object of this invention is to provide a shaped article, for example, fibers composed substantially of such a novel aromatic copolyamide and having high tensile strength and high Young's modulus, and a process for preparing the shaped article.

Still another object of this invention is to provide a dope of the aromatic copolyamine, and a process for preparing fibers which comprises forming as-spun fibers from the dope and drawing the as-spun fibers.

The other objects and advantages of this invention will become apparent from the following description.

1. Aromatic Copolyamide

The aromatic copolyamide of this invention is a high-molecular-weight fiber- or film-forming aromatic copolyamide consisting essentially of (1-A) a diamine recurring unit of the formula

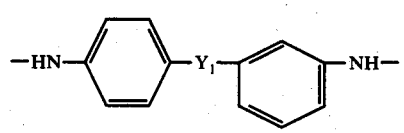

(1-A)

wherein $Y_1$ is at least one devalent moiety selected from the group consisting of

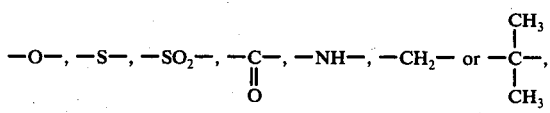

(1-B) a diamine recurring unit of the following formula $$-HN-Ar_1-NH- \quad (1-B)$$

wherein $Ar_1$ is a phenylene group, a naphthylene group, a biphenylene group or a group of the formula

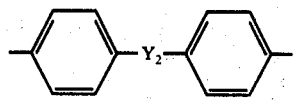

wherein $Y_2$ has the same definition as $Y_1$, and is identical to, or different from, $Y_1$, all of which groups have bond chains extending in a coaxial or parallel direction, and (2) a dicarboxylic acid-type recurring unit of the following formula $$-OC-Ar_2-CO-$$

wherein $Ar_2$ has the same definition as $Ar_1$, and is identical to, or different from, $Ar_1$, wherein the total mole number of the diamine recurring units(1-A) and (1-B) is substantially equal to the mole number of the dicarboxylic acid-type recurring unit (2), and the proportion of the recurring unit (1-A) is 7.5 to 40 mole% of the entire recurring units.

Preferred aromatic copolyamides of this invention are those in which $Y_1$ in formula (1-A) is $-O-$, $-S-$, $-SO_2-$ or

especially $-O-$.

Especially preferably, $Ar_1$ and $Ar_2$ are a phenylene, naphthylene or biphenylene group having bond chains extending in a coaxial or parallel direction. A 1,4-phenylene group is especially preferred as a group having its bond chains extending in a coaxial direction, and 1,5-naphthylene and 2,6-naphthylene groups, especially the latter, are preferred as a group having its bond chains extending in a parallel direction. Most preferably, $Ar_1$ and $Ar_2$ both represent a 1,4-phenylene group.

Where $Ar_1$ and $Ar_2$ in formulae (1-B) and (2), either alone or together, represent a group of the following formula

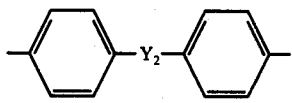

wherein $Y_2$ is the same as defined above, $Y_2$ is preferably $-O-$, $-S-$, $-SO_2-$ or

especially $-O-$.

When $Ar_1$ or $Ar_2$ is a group of the formula

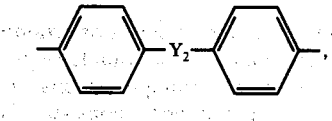

the solubility of the aromatic polyamide of this invention in solvents generally increases but its mechanical properties tend to be deteriorated, as compared with the case where $Ar_1$ or $Ar_2$ represents a 1,4-phenylene or 2,6-naphthylene group. Accordingly, by using a combination of a 1,4-phenylene group or 2,6-naphthylene group and a group of the formula

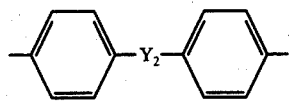

in suitable ratios according to the proportion of the diamine recurring unit of formula (1-A) (especially when the proportion of the recurring unit (1-A) is relatively low), the solubility of the aromatic copolyamide of this invention can be increased while maintaining its superior mechanical properties such as tensile strength and Young's modulus.

The aromatic copolyamide of this invention, because of containing 7.5 to 40 mole%, based on its entire recurring units, of the diamine recurring unit of formula (1-A), has noticeably increased solubility in solvents, especially organic solvents and very superior mechanical characteristics such as tensile strength and Young's modulus, as compared with an aromatic polyamide which does not at all contain the recurring unit of formula (1-A).

Furthermore, as will be apparent from a comparison run to be shown hereinbelow, the aromatic copolyamide of this invention, because of containing at least two units of formulae (1-A) and (1-B), show far higher tensile strength and Young's modulus than an aromatic polyamide composed of two recurring units of formulae (1-A) and (2).

In order to insure such good solubility and superior mechanical properties, the aromatic copolyamide of this invention preferably contains 10 to 30 mole%, especially 13 to 25 mole%, of the recurring unit of formula (1-A), based on its entire recurring units.

Preferably, the aromatic copolyamide of this invention has an inherent viscosity ($\eta_{inh}$), as determined at 30° C. for a solution of 0.5 g of the copolyamide dissolved in 100 ml. of 98% sulfuric acid, of 1 to 7, especially 1.5 to 5. These aromatic copolyamides permit the formation of high concentration dopes from which shaped articles such as fibers or films having superior mechanical properties and heat stability can be prepared.

The aromatic copolyamide of this invention consists essentially of the diamine-type recurring units of formulae (1-A) and (1-B) and the dicarboxylic acid recurring unit of formula (2). In formulae (1-B) and (2), $Ar_1$ and $Ar_2$ optionally have a substitutent, for example, a halogen atom such as chlorine or fluorine, a lower alkyl group such as methyl or ethyl, a lower alkoxy group such as methoxy or ethoxy, a cyano group, an acetyl group, or a nitro group.

The aromatic copolyamide of this invention may further contain a small amount (not exceeding 5 mole% of the entire recurring units) of another recurring unit copolymerizable with the recurring units of formulae (1-A), (1-B) and (2) as a modifying component.

2. Production of Aromatic Copolyamide

The aromatic copolyamide of this invention can be prepared by reacting (1-A) at least one aromatic diamine of the following formula

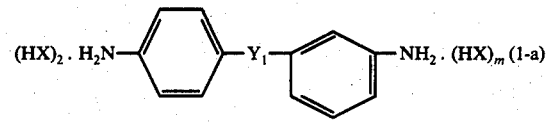

wherein $Y_1$ is at least one divalent moiety selected from the group consisting of

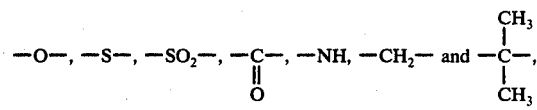

and $n$ and $m$, identical or different, are 0 or 1, and X is a halogen atom, and (1-b) at least one aromatic diamine of the following formula

wherein $Ar_1$ represents a phenylene group, a naphthylene group, a biphenylene group, all of which have bond chains extending in a coaxial or parallel direction, or a group of the following formula

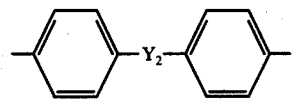

wherein $Y_2$ has the same definition as $Y_1$, and is identical to, or different from, $Y_1$, with (2) at least one aromatic dicarboxylic acid halide of the following formula

(2')

wherein $Ar_2$ has the same definition as $Ar_1$, and is identical to, or different from, $Ar_1$, in such a manner that the total mole number of the aromatic diamines (1-a) and (1-b) is substantially equal to the mole number of the aromatic dicarboxylic acid halide (2'), and the aromatic diamine (1-a) is used in an amount of 7.5 to 40 mole% based on the total amount of the diamines (1-a) and (1-b) and the dicarboxylic acid halide (2').

Because of ready availability, a chlorine atom is especially preferred as X in formulae (1-a), (1-b) and (2'). Preferred aromatic diamines of formulae (1-a) and (1-b) and aromatic dicarboxylic acid halides of formula (2') agree with the corresponding preferred recurring units described in paragraph (1) above. In the formulae (1-a) and (1-b), $m$ and $n$ are preferably both 0 or both 1.

Examples of the combinations of the diamines and dicarboxylic acid halides suitable for use in preparing the aromatic copolyamides of this invention are given in Table A below.

Table A

| No. | Aromatic diamine (1-a) | Aromatic diamine (1-b) | Aromatic dicarboxylic acid halide (2') |
|---|---|---|---|
| 1 | H₂N—C₆H₄—O—C₆H₄—NH₂ (3-amino on second ring) <br> 7.5~40 mole% | H₂N—C₆H₄—NH₂ (p-phenylenediamine) <br> 42.5~10 mole% | ClCO—C₆H₄—COCl (terephthaloyl chloride) <br> 50 mole% |
| 2 | H₂N—C₆H₄—O—C₆H₄—NH₂ <br> 7.5~40 mole% | H₂N—C₆H₄—NH₂ <br> 42.5~10 mole% | 2,6-naphthalenedicarbonyl dichloride (ClCO—C₁₀H₆—COCl) <br> 50 mole% |
| 3 | H₂N—C₆H₄—O—C₆H₄—NH₂ <br> 7.5~40 mole% | H₂N—C₆H₄—C₆H₄—NH₂ (benzidine) <br> 42.5~10 mole% | ClCO—C₆H₄—COCl <br> 50 mole% |
| 4 | H₂N—C₆H₄—O—C₆H₄—NH₂ <br> 7.5~40 mole% | H₂N—C₆H₄—NH₂ <br><br> H₂N—C₆H₄—C₆H₄—NH₂ <br> a total of 42.5~10 mole% | ClCO—C₆H₄—COCl <br> 50 mole% |
| 5 | H₂N—C₆H₄—O—C₆H₄—NH₂ <br> 7.5~40 mole% | H₂N—C₆H₄—NH₂ <br> 42.5~10 mole% | ClCO—C₆H₄—COCl <br><br> 2,6-naphthalenedicarbonyl dichloride <br> a total of 42.5~10 mole% |
| 6 | H₂N—C₆H₄—S—C₆H₄—NH₂ <br> 7.5~40 mole% | H₂N—C₆H₄—NH₂ <br> 42.5~10 mole% | ClCO—C₆H₄—COCl <br> 50 mole% |
| 7 | H₂N—C₆H₄—SO₂—C₆H₄—NH₂ <br> 7.5~40 mole% | H₂N—C₆H₄—NH₂ <br> 42.5~10 mole% | ClCO—C₆H₄—COCl <br> 50 mole% |
| 8 | H₂N—C₆H₄—CO—C₆H₄—NH₂ <br> 7.5~40 mole% | H₂N—C₆H₄—NH₂ <br> 42.5~10 mole% | ClCO—C₆H₄—COCl <br> 50 mole% |

Table A-continued

| No. | Aromatic diamine (1-a) | Aromatic diamine (1-b) | Aromatic dicarboxylic acid halide (2') |
|---|---|---|---|
| 9 | H$_2$N–C$_6$H$_4$–O–C$_6$H$_4$–NH$_2$ (3-amino) <br> H$_2$N–C$_6$H$_4$–SO$_2$–C$_6$H$_4$–NH$_2$ (3-amino) <br> a total of 7.5~40 mole% | H$_2$N–C$_6$H$_4$–NH$_2$ <br> 42.5~10 mole% | ClCO–C$_6$H$_4$–COCl <br> 50 mole% |
| 10 | H$_2$N–C$_6$H$_4$–O–C$_6$H$_4$–NH$_2$ (3-amino) <br> 7.5~40 mole% | H$_2$N–C$_6$H$_4$–O–C$_6$H$_4$–NH$_2$ <br> 0~5 % <br> H$_2$N–C$_6$H$_4$–NH$_2$ <br> a total of 42.5~10 mole% | ClCO–C$_6$H$_4$–COCl <br> 50 mole% |
| 11 | H$_2$N–C$_6$H$_4$–O–C$_6$H$_4$–NH$_2$ (3-amino) <br> 7.5~40 mole% | H$_2$N–C$_6$H$_4$–NH$_2$ <br> 42.5~10 mole% | 1,5-naphthalene-(COCl)$_2$ <br> 50 mole% |
| 12 | H$_2$N–C$_6$H$_4$–NH–C$_6$H$_4$–NH$_2$ (3-amino) <br> 7.5~40 mole% | H$_2$N–C$_6$H$_4$–NH$_2$ <br> 42.5~10 mole% | ClCO–C$_6$H$_4$–COCl <br> 50 mole% |
| 13 | H$_2$N–C$_6$H$_4$–CH$_2$–C$_6$H$_4$–NH$_2$ (3-amino) <br> 7.5~40 mole% | H$_2$N–C$_6$H$_4$–NH$_2$ <br> 42.5~10 mole% | ClCO–C$_6$H$_4$–COCl <br> 50 mole% |
| 14 | H$_2$N–C$_6$H$_4$–C(CH$_3$)$_2$–C$_6$H$_4$–NH$_2$ (3-amino) <br> 7.5~40 mole% | H$_2$N–C$_6$H$_4$–NH$_2$ <br> 42.5~10 mole% | ClCO–C$_6$H$_4$–COCl <br> 50 mole% |

As previously mentioned, the proportion of the aromatic diamine (1-a) is 10 to 30 mole %, especially 13 to 25 mole%, based on the total amount of the copolymerization components. The proportion of the aromatic diamine (1-b) is the mole percent obtained by subtracting the proportion of the aromatic diamine (1-a) from 50 mole%.

Of these illustrated combinations, the combinations in Examples 1, 2, 6, 7, 8 and 9 are preferred, and the combination of Example 1 is most preferred.

The aromatic copolyamide of this invention can be prepared by reacting at least two diamines (1-a) and (1-b) and at least one dicarboxylic acid halide (2') of suitable kinds and proportions as exemplified above in accordance with polymerization methods usually employed in the production of polyamides, such as a melt polymerization, solid phase polymerization, interfacial polymerization, or solution polymerization method. Of these, the interfacial polymerization and solution polymerization methods are preferred. The solution polymerization method is most preferred.

According to the solution polymerization method, at least two diamines of the above formulae and at least one dicarboxylic acid of the above formula are reacted in substantially equimolar proportions in an organic solvent capable of dissolving the resulting high-molecular-weight aromatic copolyamide at least partially, at a temperature of −20° C to 100° C in the presence, if desired, of an acid acceptor, thereby to form a high-molecular-weight aromatic copolyamide in accordance with this invention. Preferably, the above reaction is carried out in the presence of a halide of a metal of Groups I and II of the Mendelejeff's periodic table or a hydrogen halide. The metal halide and hydrogen halide act as a solubilization aid for the resulting aromatic copolyamide.

Amide-type solvents are suitable as the organic solvents. Examples of preferred amide-type solvents are tetramethylurea, hexamethylphosphoramide, N,N-dimethyl acetamide, N.N'-dimethyl formamide, N-methylpyrrolidone-2, N-methylpiperidone-2, N,N-dimethyl ethyleneurea, N,N,N',N'-tetramethyl malonamide, N-methylcaprolactam, N-acetylpyrrolidine, N,N-diethylacetamide, N-ethylpyrrolidone-2, N,N-dimethyl propionamide, N,N-dimethyl isobutyramide, N-methylformamide, and N,N'-dimethyl propyleneurea, and mixtures thereof. Of these, N-methylpyrrolidone-2, hexamethylphosphoramide, N,N-dimethylacetamide, N,N'-dimethylformamide, and mixtures of these are especially advantageous.

According to a preferred polymerization procedure, at least two diamines of formulae (1-a) and (1-b) or their hydrohalides are dissolved in the amide-type solvent, and then with vigorous stirring, the dicarboxylic acid halide, especially dicarboxylic acid dichloride, is added to the resulting solution. Depending upon the compounds used, the viscosity of the solution after adding the dicarboxylic acid halide rapidly or slowly increases. However, at the longest, the polymerization reaction ends substantially in 24 hours. The amide-type solvent acts also as an acid acceptor for the hydrohalide, for example, hydrochloride which has been freed as a result of the above reaction.

The reaction temperature is preferably −20° to 100° C., more preferably −5° to 70° C.

The concentrations of the monomers added in the solution polymerization reaction affect the viscosity of the polymerization solution and the degree of polymerization of the resulting polymer. The concentrations of the monomers, which increase the degree of polymerization and/or provide suitable viscosities of the polymerization solution, also vary according to the types and proportions of the monomers selected, the type of the solvent and the reaction temperature, and can be determined by a series of experiments. Generally, the preferred concentration of the monomers is 2 to 30% by weight, preferably 4 to 20% by weight.

Preferably, the solubilization aid for the resulting aromatic copolyamide as mentioned above is added to the polymerization solution before, during and/or after polymerization. Preferred solubilization aids are lithium chloride, calcium chloride, and hydrogen chloride.

When an alkaline metal compound, such as lithium hydroxide, lithium carbonate, calcium hydroxide, calcium oxide, calcium carbonate, lithium hydride, or calcium hydride, is added to the polymerization solution before, during or after polymerization, it acts as an acid acceptor or a neutralization agent for the polymerization reaction mixture, and salts of these metals formed as a result of such a neutralization reaction also serve as a solubilization assistant for the resulting aromatic copolyamides.

The solution of the resulting copolyamide obtained by the above solution polymerization method can be used directly as a shaping solution, such as a spinning dope. The polymer solution does not have to contain the metal mentioned above, but preferably contains it. If desired, a chain terminating agent can further be added to the polyermization solution. Suitable chain terminating agents are those containing only one group capable of reacting with an amino group and a haloformyl group. The solution resulting from the polymerization may be mixed with water, and the resulting precipitate, collected by filtration, washed, and dried. The dried polymer can be dissolved again in a solvent to form a spinning dope.

The aromatic copolyamides obtained by the process of this invention is a polymer which has superior solubility and affords fibers having superior dynamical properties.

It has previously been known that polyamides derived from compounds of formulae (1-b) and (2') afford fibers having superior dynamical properties. However, since such polymers are sparingly soluble in organic solvents, it is not easy to obtain solutions of the polymers having high concentrations suitable for shaping. Thus, with these conventional polyamides, it has been necessary to use solvents which are strongly corrosive and difficult to handle and recover from aqueous solutions, for example, sulfuric acid.

It has also been known that by copolymerizing a monomer of the following formula

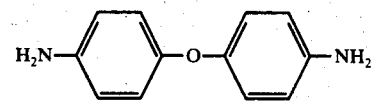

with such a polymer, the solubility of the resulting aromatic copolyamide is improved. However, such an aromatic copolyamide has deteriorated mechanical properties.

According to this invention, it has been found that by reacting the aromatic diamine of the special structure represented by formula (1-a) with the aromatic diamine of formula (1-b) and the aromatic dicarboxylic acid halide of formula (2') known heretofore, aromatic copolyamides having good solubility in solvents and superior mechanical properties such as tensile strength and Young's modulus can be obtained.

The aromatic copolyamide of this invention has superior thermal resistance and mechanical properties, and can be used in the form of solutions and films as well as fibers in various applications such as industrial materials, insulating materials, laminated structures, varnishes, adhesive materials, reinforcing materials, and synthetic paper-like sheets.

3. Spinning 3-1. Preparation of Dope

The aromatic copolyamide of this invention in the form of a solution as obtained by the solution polymerization method can be directly used as an in situ molding dope, for example, as a spinning dope. Or an aromatic copolyamide obtained by the solution polymerization method or other known methods such as a melt-polymerization method, a solid phase polymerization method, an oligomer polymerization method, an interfacial polymerization method or combinations thereof is separated and recovered from the polymerization reaction mixture, and dissolved in a suitable solvent to form a shaping solution (re-dissolving methods).

Aromatic copolyamides having an inherent viscosity of 1 to 7, preferably 1.5 to 5, above all 1.7 to 5 are preferred for preparation of shaping solutions in accordance with this invention. Use of aromatic copolyamides having an inherent viscosity within the above-specified range easily permits the formation of high concentration shapable polymer solutions, and can afford shaped articles having superior mechanical properties such as tensile strength and Young's modulus.

Irrespective of the method of preparing shaping dopes, it is advantageous to use dopes comprising of the aromatic copolyamides and an organic solvent selected from the group consisting of tetramethylurea, hexamethylphosphoramide, N,N-dimethylacetamide, N,N'-dimethylformamide, N-methylpyrrolidone-2, N-methylpiperidone-2, N,N-dimethyl ethyleneurea, N,N,N',N'-tetramethyl malonamide, N-methylcaprolactam, N-acetylpyrrolidine, N,N-diethylacetamide, N-ethylpyrrolidone-2, N,N-dimethylpropionamide, N,N-dimethylisobutyramide, N-methylformamide, N,N'-dimethylpropyleneurea, and mixtures thereof in a concentration of 4 to 20% by weight, preferably 5 to 15% by weight, in the presence of a halide of a metal of Group 1 or 2 of the Mendelejeff's periodic table or a hydrogen halide.

Advantageously, 0.2 to 10% by weight, preferably 0.5 to 5% by weight, based on the entire dope, of a halide of a metal of Group 1 or 2 of the Mendelejeff's periodic table or a hydrogen halide is added as a solubilization aid for the aromatic copolyamide. Addition of such a solubilization aid not only increases the solubility of the aromatic copolyamide in the organic solvent, but also increases the stability of dope at high temperatures. Lithium chloride, calcium chloride and magnesium bromide are especially preferred as the solubilization aid. On the other hand, in order to reduce the viscosity of the dope suitably, the addition of a hydrogen halide, preferably hydrogen chloride, is effective.

When a spinning dope is prepared by the redissolving method, it is preferred to use an aromatic polyamide pulverized sufficiently finely and having low degrees of crystallinity. Advantageously, the aromatic copolyamide is sufficiently kneaded with the organic solvent at a low temperature of, say, less than 0° C., especially less than −10° C, and then mixing them at a high temperature of, say, 50° to 100° C.

3-2. Shaping (spinning)

The dope prepared as mentioned above is extruded from a suitable opening into a coagulating bath to form a shaped article of the aromatic copolyamide. Advantageously, the coagulating bath is water or an aqueous solution containing an organic polar solvent. The organic polar solvent may be the same as the organic solvents exemplified above for use in dope preparation, and it is especially preferred to use the same organic solvent as that used in the preparation of dope.

The temperature of the coagulating bath is from 0° C. to the boiling point (at atmospheric pressure) of the coagulating bath. The concentration of the organic polar solvent in the bath is not more than 50% by weight, preferably not more than 30% by weight, based on the total amount of the bath. Depending upon the composition of the aromatic copolyamide, or the type and content of the metal halide and/or hydrogen halide in the spinning dope, the inward diffusion of the coagulating liquid to the extruded solution (dope) sometimes becomes excessive and the coagulated shaped article such as filaments becomes brittle so that a heat stretching step to follow cannot be carried out smoothly. In such a case, it is preferred to use a coagulating bath which is obtained by adding at least one inorganic salt selected from the group consisting of lithium chloride, sodium chloride, calcium chloride, magnesium chloride, zinc chloride, strontium chloride, aluminum chloride, stannic chloride, nickel chloride, calcium bromide, calcium nitrate, zinc nitrate, and aluminum nitrate to water or an aqueous solution of the polar organic solvent. The contact of the inorganic salt differs, for example, according to the composition of the spinning dope. Generally, its effect is noticeable when it is included in such an amount that the total amount (calculated as the anhydrous salt) of the inorganic salts in 1 liter of water becomes at least 2 moles.

A dope of the aromatic copolyamide of this invention containing the aromatic diamine recurring unit of formula (1A) in an amount of 7.5 to 40 mole%, especially those in which $Y_1$ is -O-, -S-, -SO$_2$-

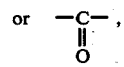

especially —O—, and preferably also containing the solubilization aid is shaped advantageously by extruding it into an aqueous coagulating bath consisting of water or an aqueous solution of the same organic solvent as used in the formation of the above dope and dissolved therein at least one inorganic salt selected from the group consisting of lithium chloride, sodium chloride, calcium chloride, magnesium chloride, zinc chloride, strontium chloride, aluminum chloride, stannic chloride, nickel chloride, calcium bromide, calcium nitrate, zinc nitrate and aluminum nitrate under the following conditions $$C \geqq 0.1 X + 2.9a$$

wherein C is the mole number of the inorganic salt calculated as the anhydrous salt per liter of water in the coagulating bath, $a$ is the mole number of the above metal halide and/or hydrogen halide (based on the anhydrous salt in the case of the halide) per liter of the dope, and $x$ is the mole percent of the recurring unit (1a) in the copolyamide.

This shaping method is suitable for preparing films or fibers, especially as-spun fibers, from the above dope. The fibers, as used herein, denote not only continuous filaments, but also non-continuous fibers.

The inorganic salts to be added to the coagulating bath can be used either alone or as a mixture of two or more. Of the illustrated species, chlorides such as magnesium chloride, calcium chloride, zinc chloride and aluminum chloride are especially preferred.

Conventional spinning apparatus can be used with satisfactory results for producing aromatic polyamide fibers in accordance with this invention. The spinning method may be any conventional method such a wet-spinning, dry spinning, so-called dry jet-wet spinning or stretch spinning. As required, a flow tube and other accesories may be used.

Preferably, an aqueous coagulating bath with or without the inorganic salt is used as a first bath, and a water bath held at room temperature to 100° C. is used as a second bath in which solvent extraction and coagulation are promoted and salts which may have been carried with the fibers from the first bath are washed and removed.

According to the present invention, a solvent involving great danger, such as conc. sulfuric acid, is not required during the preparation of filaments, and as-spun fibers haing a very dense (non-porous) structure can be prepared easily and safely using conventional apparatus.

The same can be said with regard to the preparation of films by a casting method.

4. Stretching

The as-spun fibers and cast films, especially the former, obtained by the present invention are characterized in that they can be stretched at very high ratios in spite of the fact that their substrate is composed of a wholly aromatic polyamide unlike as-spun fibers of known polyamides, such as poly(p-phenylene terephthalamide). The characteristics of such as-spun fibers are believed to be ascribable to the characteristics of the aromatic copolyamide of this invention which contains the recurring unit of formula (1-A).

Since as-spun fibers obtained by extruding the preferred dopes into the preferred coagulating baths as mentioned above have a non-porous structure, they are especially suitable for stretching at high ratios. As a result of such stretching, the fibers have superior mechanical properties such as very high tensile strength and Young's modulus and thermal stability.

Thus, according to this invention, the as-spun fibers are stretched at a stretch ratio of at least 1:3 to a ratio which does not cause the breakage of the fibers, preferably at a ratio of 1:4 to 1:20, especially preferably at a ratio of 1:6 to 1:15.

Many of fibers whose substrate is composed of the aromatic copolyamide of this invention, when stretched at a stretch ratio of 1:4 to 1:20, especially 1:6 to 1:15, have a Young's modulus of at least 400 g/denier. Especially preferred aromatic copolyamides for this purpose are those in which $Y_1$ in formula (1-A) is —O—, —S—, —SO$_2$— or

As-spun fibers prepared from an aromatic copolyamide of this invention in which $Y_1$ in formula (1-A) is —O— have a tensile strength of at least 15 g/denier and a Young's modulus of at least 400 g/denier as a result of being stretched at a ratio of 1:4 to 1:20, preferably 1:6 to 1:15, and moderate elongation. In addition, such aromatic copolyamides have the surprising advantage that spinning is possible from dopes prepared by dissolving such polyamides in organic polar solvents.

The stretching is carried out under dry or wet heat using any stretching apparatus such as hot plate or cylindrical heating oven at the glass transition temperature of the substrate polyamide of the as-spun fibers or at a higher temperature but at a temperature at which the heat deterioration of the polyamide is not great. Preferably, the as-spun fibers are stretched under dry heat at the glass transition point of the polyamide or at a higher temperature, and at a temperature within the range of 280 to 550° C., especially 300° to 520° C.

The stretching can be performed either in one stage or in a plurality of stages.

The stretched fibers may be heat-treated at the same temperature as the stretching temperature or at a higher temperature in order to increase their degree of crystallinity further.

Since the fibers in accordance with this invention have superior mechanical properties and thermal stability, they find great utility as industrial fibers in various applications such as reinforcing materials for tire cords or other rubbers and resins, thermally stable insulating materials, filtering cloths or lightweight aggregates.

The following Examples and Comparative Examples illustrate the present invention more specifically. In these examples, the inherent viscosities ($\eta_{inh}$) of the polymers were determined at 30° C. for a solution of 0.5 g of polymer dissolved in 100 ml. of concentrated sulfuric acid after isolating the polymers from the reaction mixture.

The weight loss beginning temperature is a value obtained from a differential thermal analysis curve measured by a thermal analyzer ("THERMOFLEX", a product of Rigaku Denki Co., Ltd., Tokyo, Japan) at a temperature raising rate of 10° C/minute using 8.0 mg of a sample.

EXAMPLE 1

This Example illustrates an aromatic copolyamide obtained by polymerizing 10 mole% of 3,4'-diaminodiphenyl ether, 40 mole% of para-phenylenediamine and 50 mole% of terephthaloyl dichloride.

1.201 g (0.006 mole) of 3,4'-diaminodiphenyl ether and 2,595 g (0.024 mole) of para-phenylenediamine were dissolved in 150 g of N-methylpyrrolidone-2 containing 1.0% by weight of calcium chloride in a stream of dry nitrogen. The solution was cooled to 0° C., and with vigorous stirring, 6.091 g (0.030 mole) of a powder of terephthaloyl dichloride was added rapidly. The monomers were reacted at 35° C. for 1 hour.

Then, 1.68 g of calcium oxide was added to neutralize the by-product hydrochloric acid, and at the same time, 3.00 g of calcium chloride was added. The mixture was stirred at 70° C. for 2 hours. The polymer concentration of the resulting solution was 4.7% by weight, and the concentration of calcium chloride was 4.8% by weight. The polymer had an inherent viscosity of 1.95.

The polymer solution was filtered and deaerated, and then spun into a vertical-type aqueous coagulating bath containing 50% by weight of calcium chloride and maintained at 75° C. at a linear extrusion speed of 5.5 meters/minute through a spinning nozzle having 5 orifices each with a diameter of 0.2 mm.

The as-spun filaments were passed through the coagulating bath over a distance of about 1 meter and then wound up at a rate of 6.2 meters/minute. The filaments were then passed through a water-washing bath at 80° C. over a distance of 5 meters and through a water-washing bath at 95° C. over a distance of 6 meters. The filaments were then dried by bringing them into contact with a drying roller at 110° C. over a distance of 3 meters and a drying roller at 200° C. over a distance of 5 meters. The dried filaments were drawn to 8.5 times the original length in a heated cell through which a nitrogen gas at 510° C. was flowing at a rate of 3 liters/minute.

The resulting drawn filaments had a monofilament denier size of 0.95 denier, a tensile strength of 21.5 g/de, an elongation of 4.5%, and a Young's modulus of 590 g/de.

EXAMPLES 2 to 7 and Controls 1 to 5

Examples 2 to 7 illustrate aromatic copolyamides derived from 15, 20, 25, 30, 35 and 40 mole% of 3,4'-diaminodiphenyl ether, 35, 30, 25, 20, 15 and 10 mole% of para-phenylenediamine, and 50 mole% of terephthaloyl dichloride. Controls 1 to 5 illustrate aromatic polyamides or copolyamides derived from 0, 5, 45 and 50 mole% of 3,4'-diaminodiphenyl ether, 50, 45, 35 and 0 mole% of para-phenylenediamine and 50 mole% of terephthaloyl dichloride.

The above monomers were polymerized under the polymerization conditions shown in Table 1, and the resulting polymer solutions were spun and drawn under the spinning and drawing conditions shown in Table 1 (other conditions than those shown in Table 1 were the same as in Example 1). The properties of the resulting drawn filaments are shown in Table 1. Table 1 also shows the polymerization, spinning and drawing conditions used in Example 1, and the properties of the drawn filaments obtained in Example 1.

Table 1

| | | | Control 1 | Control 2 | Control 3 | Example 1 |
|---|---|---|---|---|---|---|
| | 3,4'-diamino- | mole % | 0 | 0 | 5 | 10 |
| | diphenyl | mole | 0 | 0 | 0.004 | 0.006 |
| | ether | g | 0 | 0 | 0.801 | 1.201 |
| | p-phenylene- | mole % | 50 | 50 | 45 | 40 |
| | diamine | mole | 0.040 | 0.040 | 0.036 | 0.024 |
| | | g | 4.326 | 4.326 | 3.893 | 2.595 |
| | Terephthaloyl | mole % | 50 | 50 | 50 | 50 |
| | dichloride | mole | 0.040 | 0.040 | 0.040 | 0.030 |
| | | g | 8.123 | 8.123 | 8.121 | 6.091 |
| | Solvent | Type | CaCl₂ NMP | HMPA/NMP | CaCl₂ NMP | CaCl₂ NMP |
| | | g | 150 | 100/50 | 150 | 150 |
| Polymeriza- | Polymeriza- | temp. (° C.) | 0 - (Precipitation began immediately) | 0 - | 0 - 30 | 0 - 35 |
| tion | tion conditions | time (hr) | | | | 1 |
| | Neutralizing agent | Type | CaO | (Added 1 minute after inititation of polymerization) Li₂CO₃ | CaO | CaCl₂ CaO |
| | | g | 2.24 | 2.95 | 2.24 | 3.00 1.68 |
| | Stirring conditions | temp. (° C.) | (a slurry was formed, but no solution) | | (Became solid in 1 hour after neutralization) | 70 |
| | | time (hr) | | | | 2 |
| | Polymer solution | Polymer concentration (wt. %) | 5.8 | 5.8 | 1.8 | 4.7 |
| | | Salt concentration (wt.%) | 4.3 | 2.1 | 3.6 | 4.8 |
| | η inh | | 0.9 | 3.5 | 1.8 | 1.95 |
| | Method | | | Wet | | Wet |
| Spinning | Nozzle | diameter (mm)/number | | 0.15/5 | | 0.2/5 |
| | | Composition | | H₂O | | 50% CaCl₂ |
| | Coagulating bath | temp (° C.) | | 20 | | 75 |
| | Extrusion speed | m/min | | 5.0 | | 5.5 |
| | Wound up speed | m/min | | 6.0 | | 6.2 |
| Drawing | Temperature | (° C.) | | 510 | | 510 |
| | Draw ratio | | Spinning impossible | 1.15 | Spinning impossible | 8.5 |
| Pro- | Monofilament denier size | de | | 2.80 | | 0.95 |
| perties of drawn filaments | Tensile strength | g/d | | 7.6 | | 21.5 |
| | Elongation | % | | 4.5 | | 4.5 |
| | Young's modulus | g/d | | 445 | | 590 |

| | | | Example 2 | Example 3 | Example 4 | Example 5 |
|---|---|---|---|---|---|---|
| | 3,4'-diamino- | mole % | 15 | 20 | 25 | 30 |
| | diphenyl | mole | 0.012 | 0.0287 | 0.0174 | 0.030 |
| | ether | g | 2.403 | 5.746 | 3.484 | 6.007 |
| | p- | mole % | 35 | 30 | 25 | 20 |
| | phenylene- | mole | 0.028 | 0.0431 | 0.0174 | 0.020 |
| | diamine | g | 3.028 | 4.661 | 1.882 | 2.163 |
| | Terephthaloyl | mole % | 50 | 50 | 50 | 50 |
| | dichloride | mole | 0.040 | 0.0718 | 0.0348 | 0.050 |
| | | g | 8.121 | 14.580 | 7.068 | 10.152 |
| | Solvent | Type | NMP containing 0.85 wt % of CaCl₂ | NMP containing 0.75 wt % of CaCl₂ | NMP | NMP |
| | | g | 150 | 300 | 150 | 150 |
| Polymeriza- | Polymerization conditions | temp. (° C.) | 0 - 40 | 0 - 80 | room - 70 temp. | 0 - 60 |
| tion | | time (hr) | 3 | 1 | 5 | 2 |
| | Neutralizing agent | Type | CaO, CaCl₂ | CaO, CaCl₂ | CaO | Ca(OH)₂ |
| | | g | 2.20, 150 | 4.17, 1.11 | 1.95 | 3.70 |
| | Stirring conditions | temp. (° C.) | 90 | 80 | 90 | 80 |
| | | time (hr) | 4 | 3 | 10 | 5 |
| | Polymer solution | Polymer concentration (weight %) | 6.4 | 6.0 | 6.0 | 8.5 |
| | | Salt concentration | | | | |

Table 1-continued

| | | | | | | |
|---|---|---|---|---|---|---|
| | η inh | (weight %) | 4.3 | 3.4 | 2.3 | 3.2 |
| | Method | | 2.5 | 2.6 | 2.80 | 2.45 |
| | Nozzle | | wet | wet | wet | wet |
| Spinning | | diameter (mm)/number | 0.2/5 | 0.2/5 | 0.2/25 | 0.2/5 |
| | Coagulating bath | Composition | 50% CaCl$_2$ | 50% CaCl$_2$ | 50% CaCl$_2$ | 50% CaCl$_2$ |
| | | temp. (° C.) | 70 | 70 | 75 | 75 |
| | Extrusion speed | m/min | 5.0 | 5.0 | 5.0 | 5.0 |
| | Wound up speed | m/min | 6.0 | 6.0 | 5.2 | 6.0 |
| Drawing | Temperature | ° C. | 510 | 510 | 495 | 500 |
| | Draw ratio | | 6.0 | 9.1 | 10.0 | 10.0 |
| | Monofilament denier size | de | 2.12 | 1.75 | 1.80 | 1.38 |
| Properties of drawn filaments | Tensile strength | g/d | 24.5 | 26.4 | 27.3 | 25.1 |
| | Elongation | % | 4.6 | 4.5 | 5.0 | 4.7 |
| | Young's modulus | g/d | 620 | 640 | 620 | 616 |
| | | | Example 6 | Example 7 | Control 4 | Control 5 |
| | 3,4'-diamino-diphenyl ether | mole % | 35 | 40 | 45 | 50 |
| | | mole | 0.0405 | 0.048 | 0.045 | 0.200 |
| | | g | 8.109 | 9.611 | 9.010 | 40.05 |
| | p-phenylene-diamine | mole % | 15 | 10 | 5 | 0 |
| | | mole | 0.0173 | 0.012 | 0.005 | 0 |
| | | g | 1.870 | 1.298 | 0.541 | 0 |
| | Tere-phthaloyl dichloride | mole % | 50 | 50 | 50 | 50 |
| | | mole | 0.0578 | 0.060 | 0.050 | 0.200 |
| | | g | 11.735 | 12.183 | 10.152 | 40.61 |
| | Solvent | Type | NMP NMP | NMP | HMPA/NMP | |
| Poly-meriza-tion | Polymerization conditions | g | 150 | 150 | 150 | 200/400 |
| | | Temp. (° C.) | room - 70 temp. | 0 – 60 | 0– 60 | 0 – 60 |
| | | time (hr) | 2 | 4 | 4 | 5 |
| | Neutralizing agent | Type | Ca(OH)$_2$ | Ca(OH)$_2$ | Ca(OH)$_2$ | Li$_2$CO$_3$ |
| | | g | 4.22 | 4.44 | 3.70 | 14.78 |
| | Stirring conditions | temp.(° C.) | 120 | 80 | 60 | 60 |
| | | time (hr) | 5 | 5 | 5 | 3 |
| | Polymer Solution | Polymer concentration (wt. %) | 9.9 | 10.5 | 9.3 | 9.6 |
| | | Salt concentration (wt. %) | 3.6 | 3.8 | 3.2 | 2.5 |
| | η inh | | 2.6 | 2.10 | 2.45 | 2.40 |
| | Method | | wet | wet | wet | wet |
| | Nozzle | diameter (mm)/number | 0.2/5 | 0.2/5 | 0.15/5 | 0.10/5 |
| Spinning | Coagulating bath | Composition | 50% CaCl$_2$ | 50/ CaCl$_2$ | 50% CaCl$_2$ | 50% CaCl$_2$ |
| | | temp. (° C.) | 75 | 70 | 70 | 90 |
| | Extrusion speed | m/min | 5.5 | 5.5 | 5.0 | 2.0 |
| | Wound up speed | m/min | 6.2 | 6.2 | 5.0 | 2.0 |
| Drawing | Temperature | (° C.) | 500 | 450 | 480 | 390 |
| | Draw ratio | | 10.5 | 8.1 | 7.5 | 4.25 |
| | Monofilament denier size | de | 1.62 | 2.10 | 1.80 | 1.42 |
| Properties of drawn filaments | Tensile strength | g/d | 23.2 | 19.5 | 15.4 | 12.7 |
| | Elongation | % | 5.2 | 5.7 | 4.7 | 4.6 |
| | Young's modulus | g/d | 585 | 464 | 345 | 324 |

The weight loss beginning temperature of the polymer obtained by the polymerization in Example 2 was 410° C., and the weight loss beginning temperature of the filaments obtained by spinning and drawing was 464° C. In Example 4, the polymer obtained after the polymerization had a weight loss beginning temperature of 412° C., and the as-spun filaments obtained after spinning had a weight loss beginning temperature of 396° C.

EXAMPLES 8 to 10 and Control 6

Examples 8 to 10 illustrate aromatic copolyamides obtained by polymerizing 3,4'-diaminodiphenyl sulfide, parap-phenylene diamine and terephthaloyl dichloride. Control 5 illustrates an aromatic polyamide obtained by polymerizing 3,4'-diaminodiphenyl sulfide and terephthaloyl dichloride.

These above monomers were polymerized under the conditions shown in Table 2. The resulting polymer solutions were spun and drawn under the spinning and drawing conditions shown in Table 2 (conditions other than those shown in Table 2 were the same as in Example 1). The properties of the resulting drawn filaments are shown in Table 2.

Table 2

| | | | Example 8 | Example 9 | Example 10 | Control 6 |
|---|---|---|---|---|---|---|
| | 3,4'-diamino-diphenyl sulfide | mole % | 15 | 25 | 35 | 50 |
| | | mole | 0.0344 | 0.02 | 0.035 | 0.060 |
| | | g | 7.440 | 4.326 | 7.570 | 12.977 |
| | p-phenylene-diamine | mole % | 35 | 25 | 15 | 0 |
| | | mole | 0.0803 | 0.02 | 0.015 | 0 |
| | | g | 8.684 | 2.163 | 1.622 | 0 |
| | Tere- | mole % | 50 | 50 | 50 | 50 |

Table 2-continued

|   |   |   | Example 8 | Example 9 | Example 10 | Control 6 |
|---|---|---|---|---|---|---|
| | phthaloyl dichloride | mole | 0.1147 | 0.04 | 0.050 | 0.06 |
| | | g | 23.298 | 8.121 | 10.152 | 12.182 |
| | Solvent | Type | HMPA NMP | NMP | DMAc | NMP |
| | | g | 150 300 | 150 | 150 | 150 |
| Polymerization | Polymerization conditions | temp. (° C.) | room temp. - 50 | 0 – 70 | −10 – 60 | 0 – 70 |
| | | Time (hr) | 3 | 5 | 7 | 8 |
| | Neutralizing agent | Type | $Li_2CO_3$ | CaO | $Ca(OH)_2$ | LiOH |
| | | g | 8.47 | 2.24 | 3.70 | 2.88 |
| | Stirring conditions | temp (° C.) | 50 | 70 | 70 | 70 |
| | | Time (hr) | 5 | 8 | 10 | 10 |
| | Polymer solution | Polymer concentration (wt. %) | 6.3 | 7.0 | 9.1 | 11.7 |
| | | Salt concentration (wt. %) | 2.0 | 2.7 | 3.2 | 2.9 |
| | η inh | | 3.56 | 2.16 | 2.02 | 1.95 |
| | Method | | dryjet- | wet | wet | wet |
| | Nozzle | diameter (mm)/number | 0.2/25 | 0.2/5 | 0.2/5 | 0.15/5 |
| Spinning | Coagulating bath | Composition | $H_2O$ | $NMP/H_2O=20/80$ | $CaCl_2/H_2O=50/50$ | $CaCl_2/H_2O=50/50$ |
| | | Temp (° C.) | 60 | 50 | 90 | 90 |
| | Extrusion speed | m/min | 8.0 | 5.0 | 5.0 | 5.0 |
| | Wound up speed | m/min | 10.0 | 5.2 | 5.5 | 5.5 |
| Drawing | Temperature | (° C.) | 490 | 460 | 440 | 400 |
| | Draw ratio | | 7.7 | 8.0 | 8.5 | 5.5 |
| Properties of drawn filaments | Monofilament denier size | de | 2.47 | 2.65 | 3.13 | 3.35 |
| | Tensile strength | g/d | 16.0 | 16.7 | 15.3 | 11.6 |
| | Elongation | % | 4.2 | 3.7 | 3.5 | 4.0 |
| | Young's modulus | g/d | 420 | 485 | 471 | 266 |

EXAMPLES 11 TO 13 AND CONTROL 7

Examples 11 to 13 illustrate aromatic copolyamides obtained by polymerizing 3,4'-diaminodiphenyl sulfone, para-phenylenediamine, and terephthaloyl dichloride. Control 7 illustrates an aromatic polyamide obtained by polymerizing 3,4'-diaminodiphenyl sulfone and terephthaloyl dichloride.

The above monomers were polymerized under the polymerization conditions shown in Table 3. The resulting polymer solutions were spun and drawn under the spinning and drawing conditions shown in Table 3 (conditions other than those shown in Table 3 were the same as in Example 1). The properties of the resulting drawn filaments are also shown in Table 3.

Table 3

|   |   |   | Example 11 | Example 12 | Example 13 | Control 7 |
|---|---|---|---|---|---|---|
| | 3,4'-diaminodiphenyl sulfone | mole % | 15 | 25 | 35 | 50 |
| | | mole | 0.012 | 0.030 | 0.049 | 0.080 |
| | | g | 2.979 | 7.449 | 12.166 | 19.863 |
| | P-phenylene diamine | mole % | 35 | 25 | 15 | 0 |
| | | mole | 0.028 | 0.030 | 0.021 | 0 |
| | | g | 3.028 | 3.244 | 2.271 | 0 |
| | Terephthaloyl dichloride | mole % | 50 | 50 | 50 | 50 |
| | | mole | 0.040 | 0.060 | 0.070 | 0.080 |
| | | g | 8.121 | 12.182 | 14.212 | 16.242 |
| | Solvent | Type | HMPA containing 1.0 wt.% of LiCl | DMAc | NMP | NMP |
| | | g | 150 | 150 | 150 | 150 |
| Polymerization | Polymerization conditions | Temp. (° C.) | 0 – 60 | 0 – 70 | 0 – 80 | 0 – 80 |
| | | Time (hr) | 5 | 3 | 5 | 5 |
| | Neutralizing agent | Type | LiOH | CaO | CaO | $Ca(OH)_2$ |
| | | g | 1.91 | 3.36 | 3.92 | 5.93 |
| | Stirring conditions | Temp. (° C.) | 70 | 70 | 90 | 90 |
| | | Time (hr) | 3 | 5 | 6 | 10 |
| | Polymer solution | Polymer concentration (wt. %) | 6.8 | 10.5 | 12.9 | 15.8 |
| | | Salt concentration (wt. %) | 2.9 | 3.8 | 4.3 | 4.6 |
| | η inh | | 3.07 | 2.05 | 1.90 | 1.82 |
| | Method | | wet | wet | wet | wet |
| | Nozzle | diameter (mm)/number | 0.15/5 | 0.10/10 | 0.10/10 | 0.10/10 |
| Spinning | Coagulating bath | Composition | $CaCl_2/H_2O=37/63$ | $CaCl_2/H_2O=37/63$ | $CaCl_2/H_2O=43/57$ | $CaCl_2/H_2O=43/57$ |
| | | Temp. (° C.) | 70 | 70 | 95 | 95 |
| | Extrusion speed | m/min | 5.0 | 5.0 | 5.0 | 5.0 |
| | Wound up speed | m/min | 5.2 | 5.2 | 5.2 | 5.2 |
| Drawing | Temperature | (° C.) | 430 | 430 | 410 | 390 |
| | Draw ratio | | 6.2 | 7.3 | 6.7 | 4.5 |

Table 3-continued

|  |  |  | Example 11 | Example 12 | Example 13 | Control 7 |
|---|---|---|---|---|---|---|
| Properties of drawn filaments | Monofilament denier size | de | 1.85 | 1.13 | 1.32 | 2.55 |
|  | Tensile strength | g/d | 15.0 | 16.6 | 14.8 | 9.8 |
|  | Elongation | % | 3.5 | 4.2 | 3.8 | 3.3 |
|  | Young's modulus | g/d | 445 | 438 | 420 | 277 |

Example 1). The properties of the resulting filaments are also shown in Table 4.

Table 4

|  |  |  | Example 14 | Example 15 | Example 16 | Control 8 |
|---|---|---|---|---|---|---|
|  | 3,4'-diamino- | mole % | 15 | 25 | 35 | 50 |
|  | diphenyl | mole | 0.0105 | 0.050 | 0.042 | 0.060 |
|  | ketone | g | 2.228 | 10.612 | 8.914 | 12.734 |
|  | P- | mole % | 35 | 25 | 15 |  |
|  | phenylene- | mole | 0.0245 | 0.050 | 0.018 | None |
|  | diamine | g | 2.649 | 5.407 | 1.947 |  |
|  | Tere- | mole % | 50 | 50 | 50 | 50 |
|  | phthaloyl | mole | 0.0350 | 0.100 | 0.060 | 0.060 |
|  | dichloride | g | 7.106 | 20.303 | 12.182 | 12.182 |
|  | Solvent | Type | HMPA NMP | HMPA NMP | TMU | NMP |
|  |  | g | 75 75 | 100 200 | 150 | 150 |
| Poly- | Polymerization | Temp. (° C.) | room temp. - 50 | room temp. - 50 | 0 – 80 | 0 – 60 |
| meri- | conditions | Time (hr) | 2 | 3 | 3 | 5 |
| zation | Neutralizing | Type | CaO | CaO | CaCO₃ | Ca(OH)₂ |
|  | agent | g | 1.96 | 5.60 | 6.00 | 4.45 |
|  | Stirring | Temp. (° C.) | 60 | 60 | 70 | 60 |
|  | conditions | Time (hr) | 7 | 6 | 8 | 7 |
|  | Polymer solution | Polymer conentration (wt. %) | 5.8 | 8.5 | 10.6 | 11.4 |
|  |  | Salt concentration (wt. %) | 2.4 | 3.2 | 3.8 | 3.7 |
|  | η inh |  | 2.51 | 3.25 | 1.93 | 1.90 |
|  | Method |  | wet | dryjet wet | wet | wet |
|  | Nozzle | diameter (mm)/number | 0.2/5 | 0.2/25 | 0.15/5 | 0.12/5 |
| Spinning | Coagulating bath | Composition | NMP/H₂O=20/80 | H₂O | MgCl₂/H₂O=40/-60 | MgCl₂/H₂O=40/60 |
|  |  | Temp. (° C.) | 50 | 10 | 90 | 90 |
|  | Extrusion speed | m/min | 5.0 | 8.0 | 5.0 | 5.0 |
|  | Wound up speed | m/min | 5.2 | 10.0 | 5.2 | 5.2 |
| Drawing | Temperature | (° C.) | 450 | 450 | 420 | 390 |
|  | Draw Ratio |  | 7.5 | 6 | 7.0 | 4.0 |
| Proper- | Monofilament denier size | de | 2.61 | 3.82 | 2.56 | 2.82 |
| ties | Tensile strength | g/d | 16.3 | 17.0 | 14.4 | 10.7 |
| of drawn | Elongation | % | 3.7 | 3.8 | 3.5 | 4.0 |
| filaments | Young's modulus | g/d | 455 | 470 | 464 | 317 |

EXAMPLES 14 TO 16 AND CONTROL 8

Examples 14 to 16 illustrate aromatic copolyamides obtained by polymerizing 3,4'-diaminodiphenyl ketone, para-phenylenediamine and terephthaloyl dichloride. Control 8 illustrates an aromatic polyamide obtained by polymerizing 3,4'-diaminodiphenyl ketone and terephthaloyl dichloride.

The monomers were polymerized under the polymerization conditions shown in Table 4. The resulting polymer solutions were spun and drawn under the spinning and drawing conditions shown in Table 4 (conditions other than those shown in Table 4 were the same as in

EXAMPLES 17 AND 18 AND CONTROL 9

Examples 17 and 18 and Control 9 illustrate aromatic copolyamides obtained by polymerizing 3,4'-diaminodiphenyl ether, 4,4'-benzidine and terephthaloyl dichloride.

The monomers were polymerized under the polymerization conditions shown in Table 5. The resulting polymer solutions were spun and drawn under the spinning and drawing conditions shown in Table 5 (conditions other than those shown in Table 5 were the same as in Example 1). The properties of the resulting drawn filaments are shown in Table 5.

Table 5

|  |  | Example 17 | Example 18 | Control 9 |
|---|---|---|---|---|
| 3,4'-diamino- | mole % | 25 | 35 | 5 |
| diphenyl | mole | 0.050 | 0.070 | 0.003 |
| ether | g | 10.012 | 14.016 | 0.601 |
| 4,4'- | mole % | 25 | 15 | 45 |
| benzidine | mole | 0.050 | 0.030 | 0.027 |
|  | g | 9.212 | 5.527 | 4.974 |
| Tere- | mole % | 50 | 50 | 50 |
| phthaloyl | mole | 0.100 | 0.100 | 0.030 |

Table 5-continued

|  |  |  | Example 1 | Example 18 | Control 9 |
|---|---|---|---|---|---|
| Polymerization | dichloride | g | 20.303 | 20.303 | 6.091 |
|  | Solvent | Type | HMPA NMP | DMAc | HMPA NMP |
|  |  | g | 200 100 | 300 | 100 50 |
|  | Polymerization conditions | Temp. (° C.) | 0 – 40 | −10 – 50 | 0 – 30 |
|  |  | Time (hr) | 3 | 5 | 2 |
|  | (Neutralizing agent | Type | Ca(OH)$_2$ | Ca(OH)$_2$ | Ca(OH)$_2$ |
|  |  | g | 7.41 | 7.41 | 2.22 |
|  | Stirring conditions | Temp. (° C.) | 60 | 60 | 0 – 150 |
|  |  | Time (hr) | 5 | 5 | 6 |
| Polymer solution | Polymer concentration (wt. %) |  | 9.3 | 9.3 | 5.8 |
|  | Salt concentration (wt. %) |  | 3.2 | 3.2 | 2.0 |
|  | η inh |  | 3.20 | 2.15 |  |
| Spinning | Method |  | dryjet wet | dryjet wet | Gellation occurred, and the spinning was impossible |
|  | Nozzle | diameter (mm)/number | 0.2/25 | 0.2/25 |  |
|  | Coagulating bath | Composition | H$_2$O | H$_2$O |  |
|  |  | Temp. (° C.) | 20 | 20 |  |
|  | Extrusion speed | m/min | 8.0 | 8.0 |  |
|  | Wound up speed | m/min | 10.0 | 10.0 |  |
| Drawing | Temperature | (° C.) | 480 | 480 |  |
|  | Draw ratio |  | 6.6 | 6.4 |  |
| Properties of drawn filaments | Monofilament denier size | de | 4.1 | 3.9 |  |
|  | Tensile strength | g/d | 15.5 | 14.8 |  |
|  | Elongation | % | 3.5 | 3.7 |  |
|  | Young's modulus | g/d | 480 | 445 |  |

EXAMPLES 19 TO 21 AND CONTROL 10

Examples 19 to 21 illustrate aromatic copolyamides obtained by polymerizing 3,4′-diaminodiphenyl ether, para-phenylenediamine and 2,6-naphthylenedicarboxylic acid dichloride. Control 10 illustrates an aromatic polyamide obtained by polymerizing 3,4′-diaminodiphenyl ether and 2,6-naphthylenedicarboxylic acid dichloride.

The monomers were polymerized under the polymerization conditions shown in Table 6. The resulting polymer solutions were spun and drawn under the spinning and drawing conditions (conditions other than those shown in Table 6 were the same as in Example 1). The properties of the resulting drawn filaments are shown in Table 6.

Table 6

|  |  |  | Example 19 | Example 20 | Example 21 | Control 10 |
|---|---|---|---|---|---|---|
| Polymerization |  3,4′-diaminodiphenyl ether | mole % | 15 | 25 | 35 | 50 |
|  |  | mole | 0.009 | 0.050 | 0.056 | 0.050 |
|  |  | g | 1.802 | 10.012 | 11.213 | 10.012 |
|  | P-phenylene diamine | mole % | 35 | 25 | 15 | 0 |
|  |  | mole | 0.021 | 0.050 | 0.024 | 0 |
|  |  | g | 2.271 | 5.407 | 2.595 | 0 |
|  | 2,6-naphthylene-dicarboxylic acid chloride | mole % | 50 | 50 | 50 | 50 |
|  |  | mole | 0.030 | 0.100 | 0.0800 | 0.050 |
|  |  | g | 7.590 | 25.309 | 20.245 | 12.650 |
|  | Solvent | Type | HMPA NMP | HMPA NMP | DMAc | NMP |
|  |  | g | 100  50 | 100  200 | 300 | 150 |
|  | Polymerization conditions | Temp. (° C.) | 0 – 50 | 0 – 70 | −10 – 60 | 0 – 50 |
|  |  | Time (hr) | 3 | 3 | 5 | 3 |
|  | Neutralizing agent | Type | CaO CaCl$_2$ | Ca(OH)$_2$ | CaCO$_3$ | CaO |
|  |  | g | 1.68  2.00 | 7.40 | 8.00 | 2.80 |
|  | Stirring conditions | Temp. (° C.) | 55 | 80 | 60 | 80 |
|  |  | Time (hr) | 12 | 3 | 10 | 5 |
| Polymer solution | Polymer concentration (wt. %) |  | 5.7 | 9.6 | 8.2 | 10.8 |
|  | Salt concentration (wt. %) |  | 3.2 | 3.2 | 2.6 | 3.2 |
|  | η inh |  | 2.20 | 3.58 | 2.76 | 2.00 |
| Spinning | Method |  | dryjet wet | dryjet wet | dryjet wet | dryjet wet |
|  | Nozzle | diameter (mm)/number | 0.2/25 | 0.2/25 | 0.2/25 | 0.15/5 |
|  | Coagulating bath | Composition | H$_2$O | H$_2$O | H$_2$O | H$_2$O |
|  |  | Temp. (° C.) | 30 | 30 | 30 | 30 |
|  | Extrusion speed | m/min | 8.0 | 8.0 | 8.0 | 5.0 |
|  | Wound up speed | m/min | 10.0 | 10.0 | 10.0 | 10.0 |
| Drawing | Temperature | (° C.) | 500 | 500 | 480 | 420 |
|  | Draw ratio |  | 6.3 | 6.5 | 6.5 | 5.0 |
| Properties of drawn filaments | Monofilament denier size | de | 2.45 | 4.15 | 3.42 | 1.1 |
|  | Tensile strength | g/d | 13.1 | 13.5 | 12.7 | 12.1 |
|  | Elongation | % | 3.8 | 3.9 | 3.5 | 3.8 |
|  | Young's modulus | g/d | 493 | 400 | 455 | 348 |

EXAMPLES 22 TO 25

These Examples illustrate aromatic copolyamides obtained by polymerizing 3,4'-diaminodiphenyl ether, para-phenylenediamine and terephthaloyl dichloride.

The monomers were polymerized under the polymerization conditions shown in Table 7. The resulting polymer solutions were spun and drawn under the spinning and drawing conditions shown in Table 7 (other conditions than those shown in Table 7 were the same as in Example 1). The properties of the resulting drawn filaments are shown in Table 7.

of this solution measured by a falling-ball viscometer at 100° C. was 500 poises.

The solution was filtered, deaerated, and spun at a linear extrusion rate of 3 meters/minute into a vertical-type spinning bath containing a 55% aqueous solution of calcium chloride held at 90° C. through a spinning nozzle having 10 orifices each with a diameter of 0.1 mm. The as-spun filaments were passed through this first bath over a distance of about 50 cm, and subsequently passed through a second bath containing a 30% aqueous solution of calcium chloride at 40° C. over a distance of 70 cm. The filaments were then passed Table 7

| | | | Example 22 | Example 23 | Example 24 | Example 25 |
|---|---|---|---|---|---|---|
| | 3,4'-diamino- | mole % | 15 | 20 | 25 | 25 |
| | diphenyl | mole | 0.0344 | 0.0287 | 0.0535 | 0.0261 |
| | ether | g | 6.89 | 5.752 | 10.72 | 5.226 |
| | P- | mole % | 35 | 30 | 25 | 25 |
| | phenylene- | mole | 0.080 | 0.0431 | 0.535 | 0.0261 |
| | diamine | g | 8.68 | 4.660 | 5.79 | 2.823 |
| | Tere- | mole % | 50 | 50 | 50 | 50 |
| | phthaloyl | mole | 0.114 | 0.0718 | 0.107 | 0.0522 |
| | dichloride | g | 23.29 | 14.581 | 21.74 | 10.602 |
| | Solvent | Type | HMPA NMP | Containing NMP 0.75 wt. % of $CaCl_2$ | NMP | DMAc |
| Poly- | Polymerization | g | 150  300 | 300 | 500 | 150 |
| merization | conditions | Temp. (° C.) | 0 – 50 | room – 70 temp. | 0 – 70 | –10 – 50 |
| | | Time (hr) | 4 | 3 | 5 | 3 |
| | Neutralizing | Type | $Li_2CO_3$ | CaO, $CaCl_2$ | CaO | $Ca(OH)_2$ |
| | agent | g | 8.476 | 4.165, 1.100 | 6.00 | 3.90 |
| | Stirring | Temp. (° C.) | 50 | 90 | 90 | 50 |
| | conditions | Time (hr) | 3 | 6 | 5 | 5 |
| | Polymer solution | Polymer concentration (wt. %) | 4.2(*) | 6.0 | 5.7 | 8.6 |
| | | Salt concentration (wt. %) | 1.3 | 3.4 | 2.2 | 3.4 |
| | η inh | | 4.05 | 2.98 | 3.02 | 1.92 |
| | Method | | wet | wet | dryjet-wet | wet |
| | Nozzle | diameter (mm)/number | 0.1/40 | 0.1/5 | 0.2/5 | 0.2/1 |
| Spinning | Coagulating bath | Composition | $H_2O$ | $CaCl_2/H_2O$=42/58 | $H_2O$ | $DMAc/H_2O$=10/90 |
| | | Temp. (° C.) | 8 | 55 | 60 | 45 |
| | Extrusion speed | m/min | 3 | 2.5 | 8 | 5.0 |
| | Wound up speed | m/min | 3.1 | 2.5 | 10 | 5.5 |
| Drawing | Temperature | (° C) | 500 | 510 | 490 | 490 |
| | Draw ratio | | 3.25 | 8.4 | 7.7 | 12.5 |
| Pro- | Monofilament denier size | de | 1.04 | 0.57 | 2.0 | 2.0 |
| perties | Tensile strength | g/d | 15.3 | 22.0 | 21.0 | 25.5 |
| of drawn | Elogation | % | 3.0 | 3.6 | 4.5 | 3.9 |
| filaments | Young's modulus | g/d | 525 | 580 | 550 | 625 |

(*)HMPA:80g/NMP:160g were additionally used.

EXAMPLE 26

This Example illustrates an aromatic copolyamide obtained by polymerizing 35 mole% of 3,4'-diaminodiphenyl ether, 15 mole% of para-phenylenediamine and 50 mole% of terephthaloyl dichloride.

10.806 g (0.0540 mole) of 3,4'-diaminodiphenyl ether and 2.501 g (0.023 mole) of para-phenylenediamine were dissolved in 300 g of N-methyl-pyrrolidone-2. The solution was cooled to 0° C., and 15.669 g (0.0773 mole) of a powder of terephthaloyl dichloride was added. With vigorous stirring, the monomers were polymerized. In about 4 hours, 4.472 g of calcium oxide was added, and the mixture was further stirred for 10 hours to form a uniform clear solution. The polymer concentration of this solution was 7.0% by weight, and the polymer had an inherent viscosity of 2.95. The viscosity through a water bath at 40° C. over a distance of 5 meters, and then through a water bath at 95° C. over a distance of 3.5 meters. The filaments were then wrapped around a drying roller to dry them. The filaments so treated were drawn to 10 times the original length in a stream of nitrogen at 500° C. The drawn filaments had a monofilament denier size of 0.526 denier, a tensile strength of 24.0 g/de, an elongation of 4.45%, and a Young's modulus of 650 g/de. In this case, $x$, $a$ and C in formula (i) given hereinbefore become 35 mole%, 0.246 mole/liter of the solution, and 11 moles/-liter of $H_2O$, respectively. Thus, these factors satisfy equation (i).

Filaments obtained by repeating the same procedure as above except that the calcium chloride concentration in the first bath was changed to 25% had a monofilament denier size of 0.55 denier, a tensile strength of 19.0 g/de, an elongation of 6.6%, and a Young's modulus of 420 g/de. In this case, C becomes 3.0 moles/liter of H$_2$O, and does not satisfy the equation (i). Hence, the properties of the filaments were somewhat deteriorated.

EXAMPLE 27

This Example illustrates an aromatic copolyamide obtained by polymerizing 26 mole% of 3,4'-diaminodiphenyl ether, 25 mole% of para-phenylenediamine, 25 mole% of terephthaloyl dichloride, and 25 mole% of 2,6-naphthylenedicarboxylic acid dichloride.

3.404 g (0.017 mole) of 3,4'-diaminodiphenyl ether and 1.838 g (0.017 mole) of para-phenylene-diamine were dissolved in 150 g of N,N-dimethylacetamide in a stream of dry nitrogen and the solution was cooled to −10° C. With vigorous stirring, 3.452 g (0.017 mole) of a powder of terephthaloyl dichloride and 4.301 g (0.017 mole) of 2,6-naphthylenedicarboxylic acid dichloride were rapidly added simultaneously. The resulting solution generated heat, and its temperature rose. When its temperature reached 40° C., the viscosity of the solution gradually increased to form a highly viscous uniform clear solution. In about 3 hours, 2.52 g of calcium hydroxide was added to neutralize the by-product hydrochloric acid. The solution was heated to 60° C., and stirred for 5 hours. The resulting polymer solution had a polymer concentration of 6.4% by weight and a calcium chloride concentration of 2.3% by weight. The polymer had an inherent viscosity of 2.5.

The solution was filtered, deaerated, and extruded at a linear extrusion rate of 10 meters/minute vertically downwardly through a spinning nozzle having 5 orifices each with a diameter of 0.2 mm. The as-extruded filaments were passed through the atmosphere of the room over about 1 cm before entering an aqueous coagulating bath held at room temperature. Then, they were led into the aqueous coagulating bath and wound up at a rate of 30 meters/minute, and while being continuously washed with a water shower, wound up on a bobbin and air dried. The filaments were then wound around a hot roll with a surface temperature of 250° C. through several turns, and pre-heated. Immediately then, they were passed through a cylindrical electric oven whose central part had a temperature of 450° C. and through which a stream of nitrogen was flowing, and drawn to 6.0 times the original length. The resulting drawn filaments had a monofilament denier size of 0.98 denier, a tensile strength of 25.2 g/de, an elongation of 4.0%, and a Young's modulus of 613 g/de.

EXAMPLE 28

This Example illustrates an aromatic copolyamide obtained by polymerizing 20 mole% of 3,4'-diaminodiphenyl ether, 5 mole% of 4,4'-diaminodiphenyl ether, 25 mole% of para-phenylenediamine, and 50 mole% of terephthaloyl dichloride.

2.783 g (0.0139 mole) of 3,4'-diaminodiphenyl ether, 0.701 g (0.0035 mole) of 4,4'-diaminodiphenyl ether and 1.882 g (0.0174 mole) of para-phenylenediamine were dissolved in 150 g of N-methylpyrrolidone-2. The solution was cooled to 0° C., and with vigorous stirring, 7.068 g (0.0348 mole) of a powder of terephthaloyl dichloride was added rapidly. After a lapse of 3 hours, the mixture became a highly viscous, uniform clear solution. As a result of heat generation, the temperature of the solution reached 70° C. Then, 3.48 g of calcium carbonate was added to neutralize the by-product hydrochloric acid, and the mixture was stirred for an additional 5 hours. The resulting solution had a polymer concentration of 6.0% by weight, and a calcium chloride concentration of 2.3% by weight. The polymer had an inherent viscosity of 2.40.

The solution was filtered, deaerated, and extruded at a linear extrusion speed of 10 meters/minute into an aqueous coagulating bath containing 20% by weight of N-methylpyrrolidone-2 at room temperature through a spinning nozzle having 5 orifices each with a diameter of 0.2 mm in accordance with so-called "dry jet-wet" spinning method. The as-spun filaments were wound up at a rate of 25 meters/minute, and then washed with water and dried in a customary manner. The dried filaments were drawn to 8.5 times the original length in a cylindrical electric oven through which a stream of nitrogen was flowing at a rate of 3 liters/minute and whose central part was maintained at a temperature of 495° C. The resulting drawn filaments had a monofilament denier size of 0.83 denier, a tensile strength of 24.0 g/de, an elongation of 3.8%, and a Young's modulus of 607 g/de.

EXAMPLE 29

This Example illustrates an aromatic copolyamide obtained by polymerizing 25 mole% of 3,4'-diaminodiphenyl ether, 25 mole% of para-phenylenediamine and 50 mole% of terephthaloyl dichloride.

5.226 g (0.0261 mole) of 3,4'-diaminodiphenyl ether and 2.823 g (0.0261 mole) of para-phenylenediamine were dissolved in 150 g of N,N-dimethylacetamide, and the solution was cooled to −10° C. With vigorous stirring, 10.602 g (0.0522 mole) of terephthaloyl dichloride was added rapidly. The viscosity of the mixed solution increased gradually while the solution generated heat.

The polymerization reaction was continued for 2 hours, and the stirring was stopped. The resulting solution was mixed with a large quantity of water. The precipitated polymer was separated, washed with water, and dried. The resulting polymer had an inherent viscosity of 2.5.

The powdery polymer was mixed with tetramethylurea in which 3.0% of calcium chloride had been dissolved. The mixture was stirred to form a uniform solution having a polymer concentration of 8.0% by weight.

The resulting solution was filtered, deaerated, and wet spun at a linear extrusion speed of 5.0 meters/minute into an aqueous coagulating bath containing 42% by weight of magnesium chloride maintained at 90° C. through a spinning nozzle having 5 orifices each with a diameter of 0.2 mm. The as-spun filaments were wound up at a rate of 5.2 meters/minutes, washed well with water, and dried. Then, the dried filaments were drawn to 13.5 times the original length in an atmosphere of nitrogen maintained at 475° C. The resulting drawn filaments had a monofilament denier size of 1.77 denier, a tensile strength of 26.3 g/de, an elongation of 4.8%, and a Young's modulus of 655 g/de.

EXAMPLE 30

This Example illustrates an aromatic copolyammide obtained by polymerizing 35 mole% of 3,4'-diaminodiphenyl ether, 15 mole% of para-phenylenediamine and 50 mole% of terephthaloyl dichloride.

16.819 g (0.084 mole) of 3,4'-diaminodiphenyl ether and 3.893 g (0.036 mole) of para-phenylenediamine were dissolved in 300 g of N-methyl pyrrolidone-2. The solution was cooled to 0° C., and with vigorous stirring, 24.364 g (0.120 mole) of a powder of terephthaloyl dichloride was added rapidly. The viscosity of the mixed solution rose gradually while the solution was generating heat, and a very viscous clear solution was obtained. The solution had a polymer concentration of 10.5% by weight. The solution was mixed with a large quantity of water to precipitate the polymer in the form of flakes. The precipitated polymer flakes were washed with water, and dried. The resulting polymer powder was re-dissolved in N-methyl pyrrolidone-2 in which 2.0 wt % of lithium chloride had been dissolved to form a uniform solution having a polymer concentration of 7.0% by weight. The solution was then extruded at a linear extrusion speed of 8 meters/minute through a spinning nozzle having 5 orifices each with a diameter of 0.2 mm., downwardly through air over a distance of about 1 cm, led into an aqueous coagulating bath at room temperature, and taken up at a rate of 10 meters/minute. The filaments were well washed with water, dried, and drawn to 10.0 times the original length in an atmosphere of nitrogen at 440° C. The resulting drawn filaments had a monofilament denier size of 1.4 denier, a tensile strength of 23.5 g/de, an elongation of 4.5%, and a Young's modulus of 590 g/de.

EXAMPLE 31

This Example illustrates an aromatic copolyamide obtained by polymerizing 25 mole% of 3,4'-diaminodiphenyl ether, 25 mole% of para-phenylenediamine, and 50 mole% of terephthaloyl dichloride.

A. A polymer solution obtained in the same way as in Example 4 (the polymer concentration of 6.0% by weight, the inherent viscosity of the polymer 2.7) was spun at a linear extrusion speed of 3 meters/minute into a vertical-type aqueous coagulating bath containing 50% by weight of zinc chloride and maintained at 90° C. through a spinning nozzle having 5 orifices each with a diameter of 0.2 mm. The as-spun filaments were wound up at a rate of 3.1 meters/minute, washed and dried. The dried filaments were drawn to 13.0 times the original length in an atmosphere of nitrogen at 470° C. The resulting drawn filaments had a monofilament denier size of 1.5 denier, a tensile strength of 26.6 g/de, an elongation of 4.9%, and a Young's modulus of 595 g/de.

B. A polymer solution obtained in the same way as in Example 4 (the polymer concentration 6.0% by weight, the inherent viscosity of the polymer 2.5) was wet-spun at a linear extrusion linear speed of 3.0 meters/minute into an aqueous coagulating bath containing 40% by weight of lithium chloride and maintained at 70° C. through a spinning nozzle having 5 orifices each with a diameter of 0.2 mm, and taken up at a rate of 3.1 meters/minute. The as-spun filaments were washed, dried, and then drawn to 12.5 times the original length in an atmosphere of nitrogen at 470° C. The resulting drawn filaments had a monofilament denier size of 1.65 denier, a tensile strength of 24.8 g/de, and an elongation of 4.7%, and a Young's modulus of 610 g/de.

C. The same solution as used in (B) above was cast onto a glass sheet to a thickness of about 500 microns, and placed in a hot air drier at 180° C. to evaporate the solvent. Then, the glass sheet was placed in water at room temperature to strip off the resulting film. The film was thoroughly washed with water, dried in the air, and stretched to 6.0 times the original dimension by a manual operation on a hot plate whose surface was held at 430° C. The film had a tensile strength, in a direction parallel to the stretching direction, of 103 Kg/mm$^2$, an elongation of 2.2%, and a Young's modulus of 3,840 Kg/mm$^2$.

D. The same solution as used in Example 4 was cast on a glass sheet to a thickness of about 500 microns, and placed in a hot air drier at 150° C. to evaporate the solvent. The glass sheet was placed in water at room temperature to strip off the resulting film, and the film was thoroughly washed with water and then dried in the air.

The film was stretched to 7.7 times the original dimension by a manual operation on a hot plate whose surface was held at 450° C. The resulting stretched film had a tensile strength, in a direction parallel to the stretching direction, of 138 Kg/mm$^2$, an elongation of 2.0%, and a Young's modulus of 5,700 Kg/mm$^2$.

EXAMPLE 32

This Example illustrates an aromatic copolyamide obtained by polymerizing 25 mole% of 3,4'-diaminodiphenyl ether, 25 mole% of para-phenylenediamine and 50 mole% of terephthaloyl dichloride, from which filaments were produced at varying draw ratios.

A polymer solution obtained in the same way as in Example 4 (the polymer concentration 6.9% by weight, the inherent viscosity of the polymer 2.9) was spun at a linear extrusion speed of 4 meters/minute into an aqueous coagulating bath containing 20% by weight of N-methyl pyrrolidone-2 and maintained at 55° C. from a spinning nozzle having 5 orifices each with a diameter of 0.3 mm via a 1 am air gap in accordance with a dry jet-wet spinning method. The as-spun filaments were wound up at a speed of 4 meters/minute, washed with water, and dried to form undrawn filaments.

The undrawn filaments were fed at a rate of 3 meters/minute into a cylindrical electric oven, 5 cm in length, through which a stream of nitrogen was flowing at a rate of 3 liters/minute and whose central part was maintained at a temperature of 495° C., and drawn at varying draw ratios shown in Table 8 by changing the take-up speed. The resulting drawn filaments had the properties shown in Table 8. These drawing conditions were within the range of the present invention, but when the draw ratio was about 1:4, the properties of the resulting filaments were somewhat deteriorated. When the draw ratio reached about 1:22, the drawing became nearly excessive, and the tensile strength and Young's modulus of the resulting filaments were deteriorated.

Table 8

| Draw ratio | 4 | 6 | 8 | 10 | 16 | 22 |
|---|---|---|---|---|---|---|
| Monofilament denier (de) | 2.9 | 1.9 | 1.3 | 1.1 | 0.60 | 0.56 |
| Tensile strength (g/de) | 11.6 | 16.2 | 17.8 | 25.0 | 26.7 | 13.0 |
| Elongation (%) | 3.1 | 3.8 | 4.1 | 4.2 | 5.0 | 3.1 |
| Young's modulus (g/de) | 431 | 488 | 678 | 680 | 629 | 480 |

EXAMPLE 33

This Example illustrates an aromatic copolyamide obtained by polymerizing 25 mole% of 3,4'-diaminodiphenyl amine, 25 mole% of para-phenylenediamine and 50 mole% of terephthaloyl dichloride.

4.981 g (0.025 mole) of 3,4'-diaminodiphenylamine, and 2.704 g (0.025 mole) of para-phenylenediamine were dissolved in a mixture of 50 g of hexa-methylphosphoramide and 100 g of N-methyl pyrrolidone-2 in an atmosphere of dry nitrogen. The solution was cooled to 0° C., and with vigorous stirring, 0.152 g (0.050 mole) of a powder of terephthaloyl dichloride was added rapidly. The monomers were polymerized for 3 hours at −10° C. to 50° C. Then, 3.69 g of lithium carbonate was added to neutralize the by-product hydrochloric acid, and the mixture was stirred at 60° C. for 3 hours. The resulting polymer solution had a polymer concentration of 8.4% by weight and a lithium chloride concentration of 2.5% by weight. The polymer had an inherent viscosity of 2.13.

The polymer solution was filtered, deaerated, and extruded at a linear extrusion speed of 5.0 meters/minute into a vertical-type aqueous coagulating bath containing 50% by weight of calcium chloride and maintained at 95° C. through a spinning nozzle having 10 orifices each with a diameter of 0.2 mm. The as-spun filaments were passed through the coagulating bath over a distance of about 1 meter, and wound up at a rate of 6.0 meters/minute. Then, the filaments were passed through a water bath at 80° C over a distance of 5 meters, and then a water bath at 95° C over a distance of 6 meters. The filaments so washed were then brought into contact with a drying roller at 110° C over a distance of 3 meters, and then with a drying roller at 200° C. over a distance of 5 meters, and subsequently drawn to 10.5 times the original length in a heated cell through which a stream of nitrogen held at 450° C. was flowing at a rate of 3 liters/minute. The resulting drawn filaments had a monofilament denier size of 1.45, a tensile strength of 19.3 g/de, an elongation of 4.0%, and a Young's modulus of 2.5 g/de.

EXAMPLE 34

This Example illustrates an aromatic copolyamide obtained by polymerizing 25 mole% of 3,4'-diaminodiphenylmethane, 25 mole% of para-phenylenediamine and 50 mole% of terephthaloyl dichloride.

3.965 g (0.020 mole) of 3,4'-diaminodiphenylmethane and 2.163 g (0.020 mole) of para-phenylenediamine were dissolved in 150 g of N-methyl pyrrolidone-2 in a stream of dry nitrogen. The solution was cooled to 0° C. and with vigorous stirring, 8.121 g (0.040 mole) of a powder of terephthaloyl dichloride was rapidly added, and the monomers were polymerized for 3 hours at 0° C to 50° C. Then, 2.24 g of calcium oxide was added to neutralize the by-product hydrochloric acid. The mixture was stirred for an additional 2 hours at 60° C.

The resulting polymer solution had a polymer concentration of 6.7% by weight and a calcium chloride concentration of 2.7% by weight. The inherent viscosity of the polymer was 2.24.

The polymer solution was filtered, deaerated, and spun at a linear extrusion speed of 5.0 meters/minute into a lateral-type aqueous coagulating bath containing 20% by weight of N-methyl pyrrolidone-2 and maintained at 60° C. through a spinning nozzle having 10 orifices each with a diameter of 0.2 mm. The as-spun filaments were passed through the coagulating bath over a distance of about 1 meter, and then wound up at a rate of 6.0 meters/minute. Subsequently, the filaments were passed through a water bath at 80° C. over a distance of 5 meters and a water bath at 95° C. over a distance of 6 meters, and dried by bringing them into contact with a drying roller at 110° C. over a distance of 3 meters and a drying roller at 200° C. over a distance of 5 meters. The dried filaments were drawn to 11.0 times the original length in a heated cell through which a stream of nitrogen at 450° C. was flowing at a rate of 3 liters/minute.

The resulting drawn filaments had a monofilament denier size of 1.10 denier, a tensile strength of 16.8 g/de, an elongation of 3.8%, and a Young's modulus of 507 g/de.

EXAMPLE 35

This Example illustrates an aromatic copolyamide obtained by polymerizing 25 mole% of 3,4'-diaminodiphenyl-2,2-propane, 25 mole% of para-phenylenediamine and 50 mole% of terephthaloyl dichloride.

4.525 g (0.020 mole) of 3,4'-diaminodiphenyl-2,2-propane and 2.163 g (0.02 mole) of para-phenylenediamine were dissolved in 150 g of N,N-dimethylacetamide in an atmosphere of nitrogen. The solution was cooled to 0° C, and with vigorous stirring, 8.121 g (0.040 mole) of a powder of terephthaloyl dichloride was rapidly added. The monomers were polymerized for 3 hours at 0° to 50° C. Then, 2.24 g of calcium oxide was added to neutralize the by-product hydrochloric acid, and the mixture was stirred for an additional 3 hours at 60° C. The resulting polymer solution had a polymer concentration of 7.1% by weight, and a calcium chloride concentration of 2.7% by weight. The polymer had an inherent viscosity of 2.08.

The polymer solution was filtered, deaerated, and spun at a linear extrusion speed of 5.0 meters/minute into a lateral-type aqueous coagulating bath containing 20% by weight of N,N-dimethylacetamide and maintained at 40° C. through a spinning nozzle having 10 orifices each with a diameter of 0.2 mm. The as-spun filaments were passed through the coagulating bath over a distance of about 1 meter, and wound up at a rate of 6.0 meters/minute. Subsequently, the filaments were passed through a water bath at 80° C. over a distance of 5 meters, and then through a water bath at 95° C. over a distance of 6 meters, and dried by brining them into contact with a drying roller at 110° C. over a distance of 3 meters and a drying roller at 200° C over a distance of 5 meters. The dried filaments were drawn to 9.5 times the original length in a heated cell through which a stream of nitrogen at 450° C. was flowing at a rate of 3 liters/minute. The resulting drawn filaments had a monofilament denier size of 1.30 denier, a tensile strength of 14.7 g/de, an elongation of 3.5%, and a Young's modulus of 415 g/de.

EXAMPLE 36

This Example illustrates an aromatic copolyamide obtained by polymerizing 12.5 mole% of 3,4'-diaminodiphenyl ether, 12.5 mole% of 3,4'-diaminodiphenyl sulfone, 25 mole% of para-phenylenediamine and 50 mole% of terephthaloyl dichloride.

2.50 g (0.0125 mole) of 3,4'-diaminodiphenyl ether, 3.104 g (0.0125 mole) of 3,4'-diaminodiphenyl sulfone and 2.704 g (0.0250 mole) of para-phenylenediamine were dissolved in a mixture of 50 g of hexamethylphosphoramide and 100 g of N-methyl pyrrolidone-2 in an atmosphere of dry nitrogen. The solution was cooled to 0° C., and with vigorous stirring, 10.152 g (0.0500 mole) of terephthaloyl dichloride was added rapidly. The monomers were polymerized for 3 hours at 0° to 70° C. Then, 3.70 g of calcium hydroxide was added to neutralize the by-product hydrochloric acid. The mixture was stirred for an additional 4 hours at 80° C. The resulting polymer solution had a polymer concentration of 8.6% by weight and a calcium chloride concentration of 3.2% by weight. The inherent viscosity of the polymer was 2.19.

The polymer solution was filtered, dearated, and spun at a linear extrusion speed of 5.0 meters/minute into a vertical-type aqueous coagulating bath containing 50% by weight of calcium chloride and maintained at 95° C through a spinning nozzle having 10 orifices each with a diameter of 0.2 mm. The as-spun filaments were passed through the coagulating bath over a distance of about 1 meter, and wound up at a rate of 6 meters/minute. Subsequently, the filaments were washed by passing them through a water bath at 80° C. over a distance of 5 meters and then through a water bath at 95° C over a distance of 6 meters, and dried by bringing them into contact with a drying roller at 110° C. over a distance of 3 meters and a drying roller at 200° C over a distance of 5 meters. The dried filaments were drawn to 12.0 times the original length in a heated cell through which a stream of nitrogen at 450° C was flowing at a rate of 3 liters/minute. The resulting drawn filaments had a monofilament denier size of 1.31 denier, a tensile strength of 15.2 g/de, an elongation of 3.8%, and a Young's modulus of 430 g/de.

EXAMPLE 37

This Example illustrates an aromatic copolyamide obtained by polymerizing 25 mole% of 3,4'-diaminodiphenyl ether dihydrochloride, 25 mole% of para-phenylenediamine dihydrochloride and 50 mole% of terephthaloyl dichloride.

6.83 g (0.025 mole) of 3,4'-diaminodiphenyl ether dihydrochloride and 4.53 g (0.025 mole) of para-phenylenedimaine dihydrochloride were dissolved in a mixture of 50 g of N-methyl pyrrolidone-2 and 50 g of hexamethylphosphoramide in a stream of dry nitrogen. At room temperature, the solution was vigorously stirred, and at the same time, 10.15 g (0.05 mole) of a powder of terephthaloyl dichloride was added rapidly. After a lapse of 10 minutes, the solution was heated to 50° C., and stirred continuously for about 2 hours. Then, 2.80 g of calcium oxide was added to neutralize about ⅓ of the total amount of the by-product hydrochloric acid, and the mixture was stirred for an additional 3 hours at 50° C.

The polymer solution so obtained had a polymer concentration of 11.5% by weight and a calcium chloride concentration of 4.5% by weight. The polymer had an inherent viscosity of 1.57.

The polymer solution was spun at a linear extrusion speed of 3.0 meters/minute into a vertical-type aqueous coagulating bath containing 50% weight of calcium chloride and maintained at 40° C. through a spinning nozzle having 5 orifices each with a diameter of 0.15 mm. The as-spun filaments were passed through the coagulating bath over a distance of 70 cm, and wound up at a rate of 3.1 meters/minute. The filaments were then passed over a distance of 5 meters through each of three water baths maintained at a temperature 50° C, 70° C, and 90° C respectively to wash them thoroughly. Then, the filaments were dried by contacting them with a hot roller whose surface was maintained at 120° C., and then drawn to 11.5 times the original length in an atmosphere of nitrogen at 490° C. The resulting drawn filaments had a monofilament denier size of 1.37 denier, a tensile strength of 15.5 g/de, an elongation of 3.7%, and a Young's modulus of 458 g/de.

What we claim is:

1. A fiber- or film-forming high-molecular weight aromatic copolyamide consisting essentially of (1-A) a diamine recurring unit of the following formula

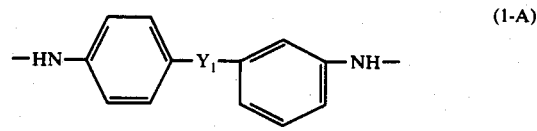 (1-A)

wherein $Y_1$ is at least one divalent-moiety selected from the group consisting of —O—, —S—, —SO$_2$—,

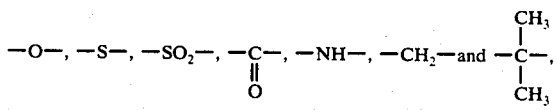

(1-B) a diamine recurring unit of the following formula

—HN—AR$_1$—NH— (1-B)

wherein Ar$_1$ represents a phenylene group, a naphthylene group, a biphenylene group or a group of the formula

wherein $Y_2$ has the same definition as $Y_1$ and is identical to, or different from, $Y_1$, all of which groups have their bond chains extending in a coaxial or parallel direction, and (2) a dicarboxylic acid-type recurring unit of the following formula —OC—Ar$_2$—CO— (2)

wherein Ar$_2$ has the same definition as Ar$_1$, and is identical to, or different from, Ar$_1$, the total mole number of the diamine recurring units of formulae (1-A) and (1-B) being substantially equal to the mole number of the dicarboxylic acid-type recurring unit of formula (2), and the proportion of the diamine recurring unit (1-A) being 7.5 to 40 mole% of the entire recurring units.

2. The aromatic copolyamide of claim 1 wherein the proportion of the diamine recurring unit of formula (1-A) is 10 to 30 moles of the entire recurring units.

3. The aromatic copolyamide of claim 1 which has an inherent viscosity, as determined at 30° C. for a solution of 0.5 g of polymer dissolved in 100 ml. of 98% sulfuric acid, of 1 to 7.

4. The aromatic copolyamide of claim 3 which has an inherent viscosity of 1.5 to 5.

5. The aromatic copolyamide of claim 1 wherein $Y_1$ in formula (1-A) is at least one divalent moiety selected from the group consisting of —O—, —S—, —SO$_2$— and

6. The aromatic copolyamide of claim 1 wherein $Y_1$ in formula (1-A) is —O—.

7. The aromatic copolyamide of claim 1 wherein —$AR_1$— and —$AR_2$— in formulae (1-B) and (2) each represent a phenylene, naphthylene or biphenylene group having its bond chains extending in a coaxial or parallel direction.

8. The aromatic copolyamide of claim 1 wherein —$Ar_1$— and —$Ar_2$— in formulae (1-B) and (2) each represent a para-phenylene group.

9. The aromatic copolyamide of claim 1 wherein $Y_1$ in formula (1-A) is —O—, and —$Ar_1$— and —$Ar_2$— in formulae (1-B) and (2) each represent a para-phenylene group.

10. A shaped article consisting essentially of the high-molecular-weight aromatic copolyamide of claim 1.

11. Fibers consisting essentially of the high-molecular-weight aromatic polyamide of claim 1.

12. Films consisting essentially of the high-molecular-weight aromatic copolyamide of claim 1.

13. Fibers according to claim 11 which have a Young's modulus of at least 400 g/denier.

14. Fibers according to claim 11 composed essentially of the high-molecular-weight copolyamide in which $Y_1$ in formula (1-A) is —O— and which have a Young's modulus of at least 400 g/denier and a tensile strength of at least 15 g/denier.

15. The aromatic copolyamide of claim 1 wherein the proportion of the diamine recurring unit of formula (1-A) is 13 to 25 mole % of the entire recurring units.

* * * * *

UNITED STATES PATENT OFFICE
CERTIFICATE OF CORRECTION

Patent No. 4,075,172            Dated February 21, 1978

Inventor(s) Ozawa, et al.

It is certified that error appears in the above-identified patent and that said Letters Patent are hereby corrected as shown below:

Claim 1, line 6, after "of", delete "-O-, -S-, $-SO_2-$"

Signed and Sealed this

Sixth Day of February 1979

[SEAL]

Attest:

RUTH C. MASON
Attesting Officer

DONALD W. BANNER
Commissioner of Patents and Trademarks